(12) United States Patent
Knapp

(10) Patent No.: US 8,463,680 B2
(45) Date of Patent: Jun. 11, 2013

(54) SYSTEM AND METHOD FOR ENHANCING FINANCIAL INSTITUTION REVENUES THROUGH ACCELERATION OF DEBIT PROCESSING

(76) Inventor: Will Knapp, Cayucos, CA (US)

(*) Notice: Subject to any disclaimer, the term of this patent is extended or adjusted under 35 U.S.C. 154(b) by 0 days.

(21) Appl. No.: 13/448,344

(22) Filed: Apr. 16, 2012

(65) Prior Publication Data

US 2012/0203691 A1    Aug. 9, 2012

Related U.S. Application Data

(63) Continuation of application No. 12/901,216, filed on Oct. 8, 2010, now Pat. No. 8,160,945, which is a continuation of application No. 11/432,493, filed on May 12, 2006, now Pat. No. 7,814,019, which is a continuation of application No. 10/402,218, filed on Mar. 31, 2003, now Pat. No. 7,062,463.

(51) Int. Cl.
*G06Q 40/00* (2006.01)

(52) U.S. Cl.
USPC .............................................. 705/35; 705/36

(58) Field of Classification Search
USPC ...................................................... 705/35–40
See application file for complete search history.

(56) References Cited

U.S. PATENT DOCUMENTS

| | | | |
|---|---|---|---|
| 4,617,457 A | 10/1986 | Granzow et al. | |
| 4,743,743 A | 5/1988 | Fukatsu | |
| 4,810,866 A | 3/1989 | Lord, Jr. | |
| 4,933,536 A | 6/1990 | Lindenmann et al. | |
| 5,484,988 A | 1/1996 | Hills et al. | |
| 5,532,464 A | 7/1996 | Josephson et al. | |
| 5,783,808 A | 7/1998 | Josephson | |
| 6,038,552 A | 3/2000 | Fleischl et al. | |
| 6,304,860 B1 | 10/2001 | Martin, Jr. et al. | |
| 6,408,284 B1 | 6/2002 | Hilt et al. | |
| 7,062,463 B2 | 6/2006 | Knapp | |
| 2002/0042751 A1 | 4/2002 | Sarno | |
| 2002/0046143 A1 | 4/2002 | Eder | |
| 2002/0198835 A1 | 12/2002 | Watson | |
| 2003/0033245 A1 | 2/2003 | Kahr | |
| 2003/0172013 A1 | 9/2003 | Block et al. | |
| 2003/0233299 A1 | 12/2003 | Davis et al. | |
| 2004/0153400 A1* | 8/2004 | Burke ............................. 705/39 |

OTHER PUBLICATIONS

*A New Approach to Covering Overdrafts*, Bank Director Second Quarter 2002, [retrieved Nov. 21, 2002] at http://www.lexis.com/research/retrieve?_m=5bef5ce2bec346d4cf58ed600cfc78c2&docnu . . . , 5 pages.

Devlin, J., *Banking Special Issue: Check Processing: The need for Speed*, [retrieved Nov. 21, 2002] at http://www.armadillosoft.com/articles/banks/index.php?newTopic=11speed, 2 pages.

(Continued)

*Primary Examiner* — Thu Thao Havan
(74) *Attorney, Agent, or Firm* — Sterne, Kessler, Goldstein & Fox P.L.L.C.

(57) ABSTRACT

A system and method for enhancing financial institution revenue through acceleration of debit processing is provided. The method includes modeling the processing of account debit transactions, identifying ways to accelerate the processing of the account debit transactions and accelerating the account debit transactions. In a further embodiment, account debit transaction processing is accelerated from beginning on what has traditionally been referred to as Day 0 to beginning on some day before Day 0.

11 Claims, 10 Drawing Sheets

OTHER PUBLICATIONS

Atlas, Riva D. *Checking is Free, but the Profits are Hefty*, The New York Times [online], Nov. 12, 2002, [retrieved Nov. 13, 2002] at http://www.nytimes.com/2002/11/12/business/12FREE.html?pagewanted-print&position . . . 3 pages.

*Compass Bank and Compass Bancshares, Inc.* v. *Jucretia Snow et al.*, 823 So. 2d 667, Dec. 28, 2001 (release date), 14 pages.

*Electronic Checks Coming to Town*, ABA Bankers News, Jul. 23, 2002, [retrieved Nov. 21, 2002] at http://www.lexis.com/research/retrieve?_m=5f7c306c725ac9f985eb04cf6aca_1_dee&docnu, 2 pages.

*Endpoint: The National Check Image Exchange*, Bankers News, Jun. 2002, [retrieved Nov. 21, 2002] at http://www.lexis.com/research/retrieve?_m=5f7c306c725ac9f985eb04cf6aca_1_dee&docnu . . . , 5 pages.

Gerdes, Geoffrey R. et al., *The Use of Checks and Other Noncash Payment Instruments in the United States*, Federal Reserve Bulletin, Aug. 2002, pp. 360-374.

*ECP 101: The Basics*, ECCHO and Carreker-Antinori, Inc., 1998, 38 pages.

*Hill* v. *St. Paul Federal Bank for Savings*, 329 Ill. App. 3d 705, Mar. 29, 2002, 5 pages.

*ECP Benefit Report*, Nov. 1998, 24 pages.

US 6,331,134, 12/2001, Sachan et al. (withdrawn)

\* cited by examiner

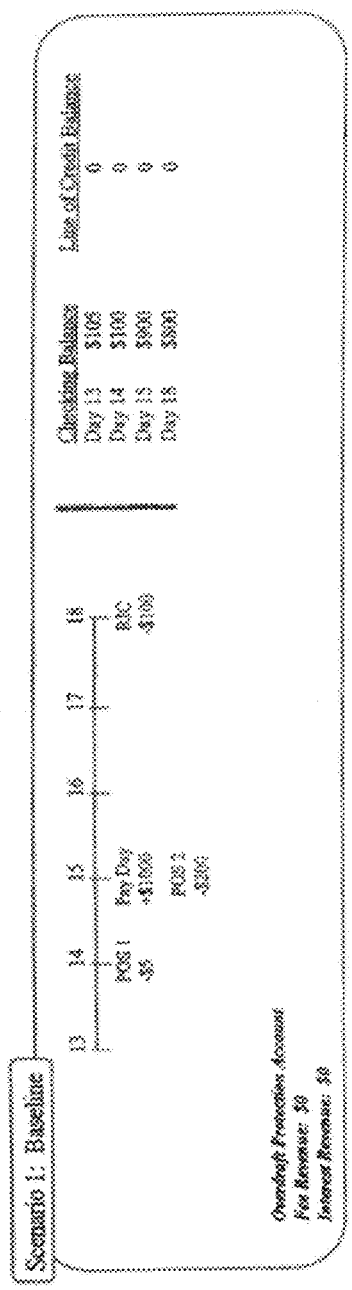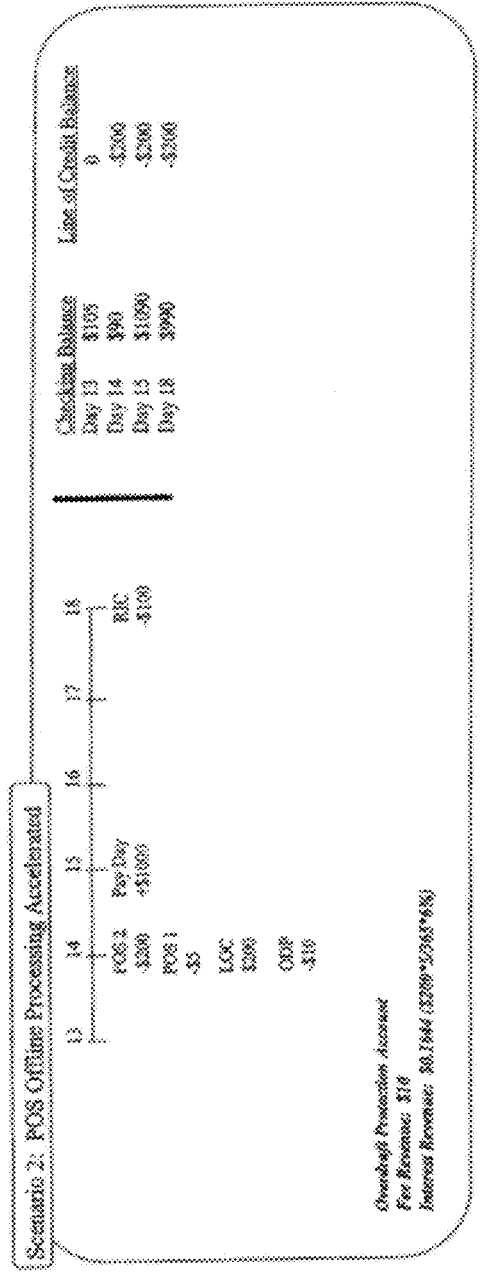
FIG. 1A
FIG. 1B

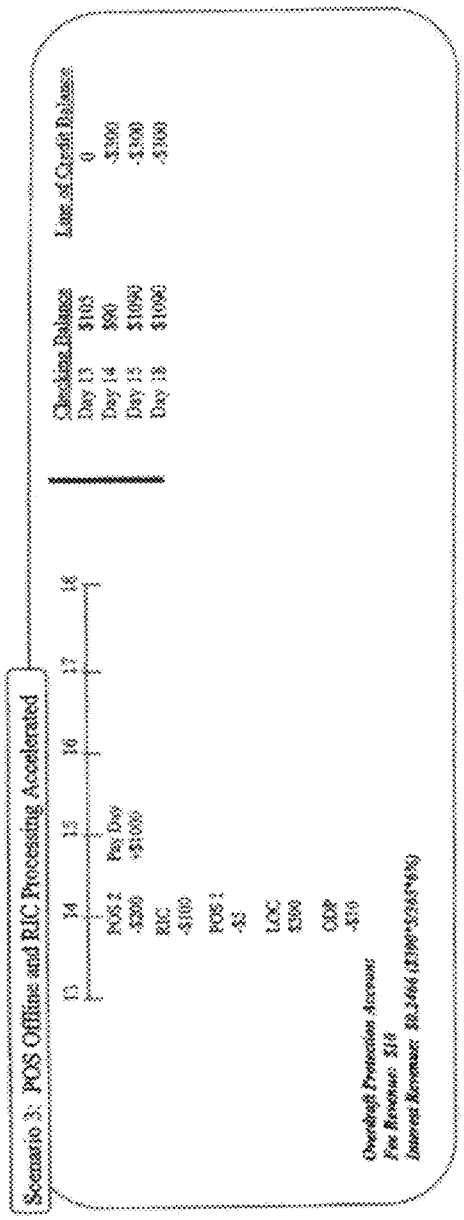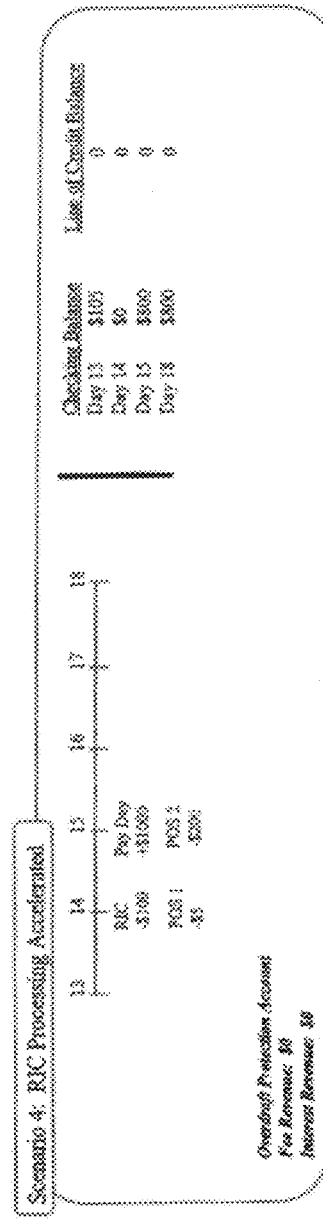
FIG. 1C
FIG. 1D

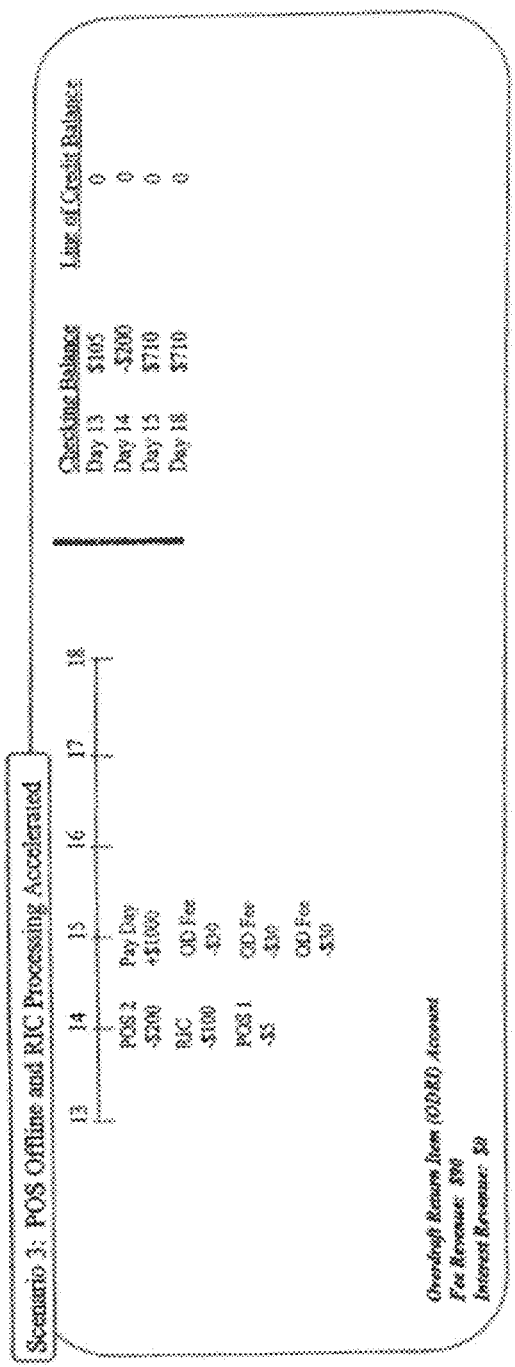
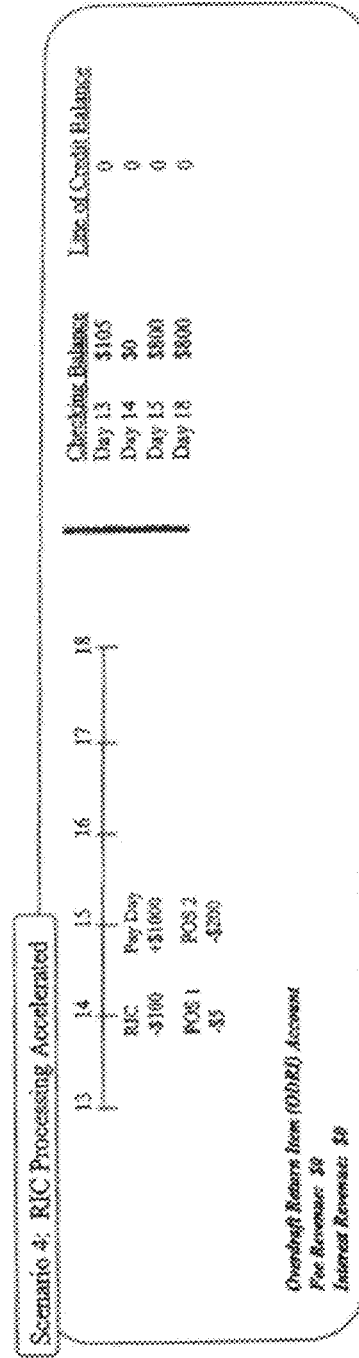
FIG. 2C
FIG. 2D

SYSTEM AND METHOD FOR ENHANCING FINANCIAL INSTITUTION REVENUES THROUGH ACCELERATION OF DEBIT PROCESSING

CROSS REFERENCE TO RELATED APPLICATIONS

The present application is a continuation of and claims priority under 35 U.S.C. §120 to U.S. patent application Ser. No. 12/901,216, ('216 Application) entitled System and Method for Enhancing Financial Institution Revenues Through Acceleration of Debit Processing. The '216 Application in turn is a continuation of and claims priority under 35 U.S.C. 120 to U.S. Pat. No. 7,814,019 ('019 Patent) entitled System and Method for Enhancing Financial Institution Revenues Through Acceleration of Debit Processing. The '019 Patent in turn is a continuation of and claims priority under 35 U.S.C. 120 to U.S. Pat. No. 7,062,463, entitled System and Method for Enhancing Financial Institution Revenues Through Acceleration of Debit Processing, filed on Mar. 31, 2003, all of which are hereby expressly incorporated by reference herein in there entireties.

BACKGROUND OF THE INVENTION

1. Field of the Invention

The invention relates to financial institution operating procedures, and more particularly, to accelerating the processing of debit transactions.

2. Background of the Invention

Debit transaction processing refers to the processing of a financial transaction by a financial institution, such as a bank. In the transaction an entity authorizes the financial institution to debit an account that contains money belonging to the entity, but held by the financial institution. The financial institution may hold the monies in a checking, savings or other type of customer account. Alternatively, in a transaction an entity may authorize a financial institution to charge a credit account for which the entity is liable to repay. Such transactions are commonplace in today's society and form the backbone of our economic system. Each day trillions of dollars worth of debit transactions are processed within the United States.

In the traditional banking business model for customer accounts, a bank tried to maximize the amount of money in the bank based on the view that the more money in the bank, the greater the bank's interest revenues. In this view, accelerating the processing of debit transactions would tend to diminish the amount of money in a bank and therefore diminish revenues and profits. Changes in banking technology, regulation, and economic conditions allow this model to be challenged and refined. Banks have merged, thereby, increasing individual bank size and market share. Interest rates and the cost of funds are low. As a result, bank fee revenues have become increasingly important, compared to interest revenues, in the generation of profits.

Debit transactions may either be customer-initiated or bank-initiated. Debit type as used herein refers to a type of debit drawn from a customer account. Examples include a point of sale (POS) debit, a check debit, and an overdraft fee debit. Examples of customer-initiated debit transactions include POS transactions, automatic teller machine (ATM) withdrawals, and presentment of paper checks.

Bank-initiated debit transactions may be either service transaction fees or account maintenance fees. Service transaction fees are fees directly associated with a particular type of customer-initiated debit transaction, such as an ATM fee that is charged to the customer's account when an ATM withdrawal is made. Account maintenance fees are fees indirectly associated with customer-initiated debit transactions, but often triggered by them. Account maintenance fees can be either customer transaction driven or cycle driven. Account maintenance fees that are cycle driven are debited from a customer account at the end of the banking cycle, which is often a monthly cycle at which time a customer receives a monthly statement. An example of this type of fee is a fee for an account balance dropping below a minimum requirement. Account maintenance fees that are customer transaction driven are fees directly associated with customer-initiated debit transactions, and often triggered by them. These are fees that can be imposed prior to the end of the banking cycle. An example of this type of fee is an overdraft fee imposed when an account balance drops below zero.

Numerous methods and devices exist for processing debit transactions. For example, U.S. Pat. No. 4,933,536 to Lindemann et al., describes a check processing device which is used together with a POS terminal. U.S. Pat. No. 4,810,866 to Lloyd, Jr., describes a check validation system located with a POS system for imprinting and otherwise handling a check. Other examples include U.S. Pat. No. 4,743,743 to Fuakatsu which describes an apparatus where a check is examined by a reader at a POS terminal. Other systems for processing checks have also been the subject of invention. U.S. Pat. No. 4,617,457, for example, addresses an ATM form of cashing checks. These patents largely focus on the problem of how to accept checks and to prevent fraudulent activity.

U.S. Pat. No. 5,484,988 to Hills et al., addresses a further aspect of check transaction processing, in that, the patent relates to a checkwriting POS system that integrates with the automated clearing house (ACH) process, primarily to enable greater flexibility as to the types of purchases that may be made and eliminate the need for paper checks.

Another category of systems dealing with transaction processing involves electronic check processing (ECP). ECP provides a mechanism for financial institutions to computerize check data at the bank of first deposit (BoFD) and send the electronic representation of the check to the payor's bank at least one day ahead of the paper check. Because the electronic representation of the paper check arrives before the actual paper check, the posting of the debit can occur prior to bank-to-bank settlement, which is triggered by the arrival of the paper check. ECP applies when the BoFD is not the payor's bank which posts the customer's debit.

A number of U.S. patents and a significant number of industry publications address ECP. For example, U.S. Pat. No. 5,532,464 to Josephson et al., and U.S. Pat. No. 5,783,808 to Josephson et al., address systems to handle various aspects of handling paper checks to convert them to electronic information and manage the delivery of the paper checks in an ECP environment.

Still other devices and systems address other aspects of transaction processing. One such category of devices and systems adds functionality to electronic payment schemes, and makes use of credit and debit cards easier. For example, U.S. Pat. No. 6,408,284 to Hilt, et al., describes an electronic bill payment system that enables consumers to send messages via the Internet directing financial institutions to pay a biller's bill. Similarly, U.S. Pat. No. 6,038,552 to Fleischl et al., describes a method and apparatus to process combined credit and debit card transactions.

Additionally, other methods for transaction processing are disclosed in court cases. See e.g., *Compass Bank and Compass Bancshares v. Jucretia Snow* et al., 823 So. 2d 667 (Ala.

2001). In these cases banks altered the order in which checks and other debit items presented on a given day are posted to the customer's account. In particular, the banks posted the debit items from largest to smallest, so that more bank-initiated fees would be incurred.

All the above patents and practices deal generally with transaction processing. However, none deal with the issue of accelerating debit transactions relative to credit transactions in a customer account, irrespective of any settlement or settlement date. Furthermore, none deal with accelerating the posting of any type of debit transaction across any business day or number of days. As a result, because the processing of debit transactions has not been optimized, financial institutions may be losing significant revenues that would accrue from accelerated debit transaction processing.

Unfortunately, the determination of the benefits of acceleration of debit transactions is complex and misunderstood. This, in fact, may be why more attention has not been given to this problem. To determine the impacts of accelerating debit transactions, many variables and factors must be considered. These include customer reactions, regulatory limitations, implementation costs and prioritization considerations. The interplay of these factors and industry misconceptions (e.g., related to what day processing of a debit transaction can actually begin) make the task of analyzing the impacts of accelerating debit transactions difficult.

What is needed is a method for increasing financial institution revenues through the acceleration of posting debits to a customer account, relative to the credit transactions in that account and irrespective of any settlement or settlement date.

What is also needed is a method and system to determine and measure the financial impacts of such acceleration.

SUMMARY OF THE INVENTION

The present invention is directed to a system and method for enhancing financial institution revenue through acceleration of debit processing. The acceleration of debit transaction processing often leads to the generation of additional bank-initiated account maintenance fees, thereby potentially increasing bank revenues. The method includes selecting a customer account type to be examined, selecting a debit type to be examined, mapping the debit transaction processing, identifying processing intervals that can be reduced and determining a revenue impact that can result from acceleration. In a further feature of the invention, an acceleration technique is implemented to achieve the potential revenue gains. In another feature of the invention, the above methods are repeated for all customer account types and for all debit types.

In one embodiment, debit transaction processing is accelerated from beginning on what has traditionally been referred to as Day 0 to beginning on some day prior to Day 0. In another embodiment, debit transaction processing is accelerated by adjusting cut-off times for processing transactions to facilitate faster posting of debits to customer accounts.

Additionally, a method and system are provided to determine the impacts of accelerating debit transaction processing. The system includes a number of engines including a baseline engine, an accelerator engine, a customer impact engine, a regulatory limitation engine, a prioritization engine and a cost limitations engine. Working together and using various databases to streamline use, the system enables a user to understand the revenue impacts of accelerating debit transaction processing.

Use of the invention provides significant benefits. First, use of the invention can generate significant additional revenues to financial institutions. For example, by accelerating the processing of customer-initiated debit transactions, a financial institution can generate additional bank-initiated account maintenance fees resulting from a greater number of account overdrafts and/or account balances that drop below a minimum balance requirement.

Second, while the potential revenue increases from accelerating debit transaction processing are high, they are not easily understood. Existing financial institution processes demonstrate this point in that these processes currently include unnecessary and readily addressable delays in the processing of debit transactions. In fact, the potential benefits of accelerating the processing of debit transactions are misunderstood. For example, historically, banks have not focused on acceleration of debit transactions relative to customer credits. A number of other factors related to Byzantine regulatory requirements and perceptions regarding the cost to implement changes relative to the potential benefits, impede gaining an accurate understanding of the impacts of accelerating the processing of debit transactions.

Further embodiments, features, and advantages of the invention, as well as the structure and operation of the various embodiments of the invention are described in detail below with reference to accompanying drawings.

BRIEF DESCRIPTION OF THE FIGURES

The invention is described with reference to the accompanying drawings. In the drawings, like reference numbers indicate identical or functionally similar elements. The drawing in which an element first appears is indicated by the left-most digit in the corresponding reference number.

FIGS. 1A-1D are diagrams of scenarios for accelerated debit processing within an overdraft protection (ODP) account, according to an embodiment of the invention.

FIGS. 2A-2D are diagrams of scenarios for accelerated debit processing within an overdraft return item (ODRI) account, according to an embodiment of the invention.

DETAILED DESCRIPTION OF THE INVENTION

Figure 2A:
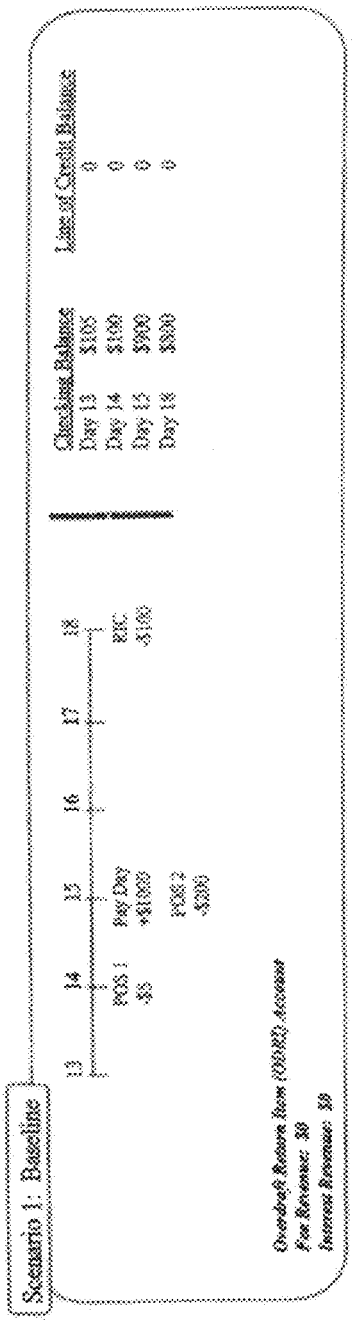

While the invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

Throughout the detailed description of the invention for ease of discussion the term bank will be used. The term bank should be interpreted to represent any type of financial institution that holds customer accounts, such as checking, savings, money market, brokerage, credit card and the like.

Acceleration of debit transaction processing provides the opportunity for significant enhancement to financial institution revenues. FIGS. 1A-1D and 2A-2D provide example transactions in two types of customer accounts: an overdraft protection (ODP) account and an overdraft return item (ODRI) account. The examples demonstrate how incremental revenues can be produced through the acceleration of debits.

FIGS. 1A-1D provide four scenarios for posting debits to an overdraft protection account. In the example, the overdraft protection account is assumed to be a checking account that is linked to a line of credit account. In other examples, the checking account may be linked to a savings account, a credit card account, or other type of account. In the event that an individual overdraws the checking account, the bank will automatically transfer funds at the close of the business day from the line of credit account to the checking, account to cover the overdrawn amount. In doing so, the bank will impose an overdraft protection fee. In this example, the checking account does not bear interest. There can be many variations to overdraft protection accounts.

Likewise, FIGS. 2A-2D provide the same four scenarios for posting debits to an overdraft return item (ODRI) account. In this case, if a customer overdraws his account, the bank will charge the customer an overdraft fee for each debit transaction that overdraws the account or occurs when the account is overdrawn. Also, in this example, the checking account does not bear interest. There can be many variations to overdraft return item accounts.

Both FIG. 1 and FIG. 2 provide four scenarios to illustrate the impacts of debit processing acceleration and to demonstrate the different impacts that acceleration has on different account types over a six day period. In each scenario, the time period runs from a Wednesday (represented as the $13^{th}$ of a month) to a Monday (represented as the $18^{th}$ of a month). During this period a customer starts with a positive balance of $105, and receives a credit of $1,000 on the $15^{th}$, representative of a direct deposit of their salary. For most customers, the date of credits for paydays is fixed by their employers, and therefore can not be adjusted. As can be seen from the scenarios, the critical factor driving incremental revenue to the bank is that debits are accelerated relative to the credit activity in that customer's account—in this case the customer's payday.

In the baseline scenarios in both FIG. 1A and FIG. 2A, the customer begins with a checking account balance of $105 and a line of credit account balance of $0. The line of credit account is assumed to incur simple interest at the rate of 6% per year, computed daily and charged monthly, at the end of each month. The checking account is assumed to pay no interest. On Thursday, the $14^{th}$ the customer's account is debited $5 for an POS online transaction (POS 1). On Friday the $15^{th}$, the customer's account is credited $1000, representative of his salary amount. On the same day, a PUS offline debit (POS 2) for $200 is posted. On Monday the $18^{th}$, an incoming returned item check debit (RIC) in the amount of $100 posts to the customer's checking account. In the baseline scenarios, the accounts are not overdrawn and the bank receives no revenue from fees or interest in either case.

Figure 2B:
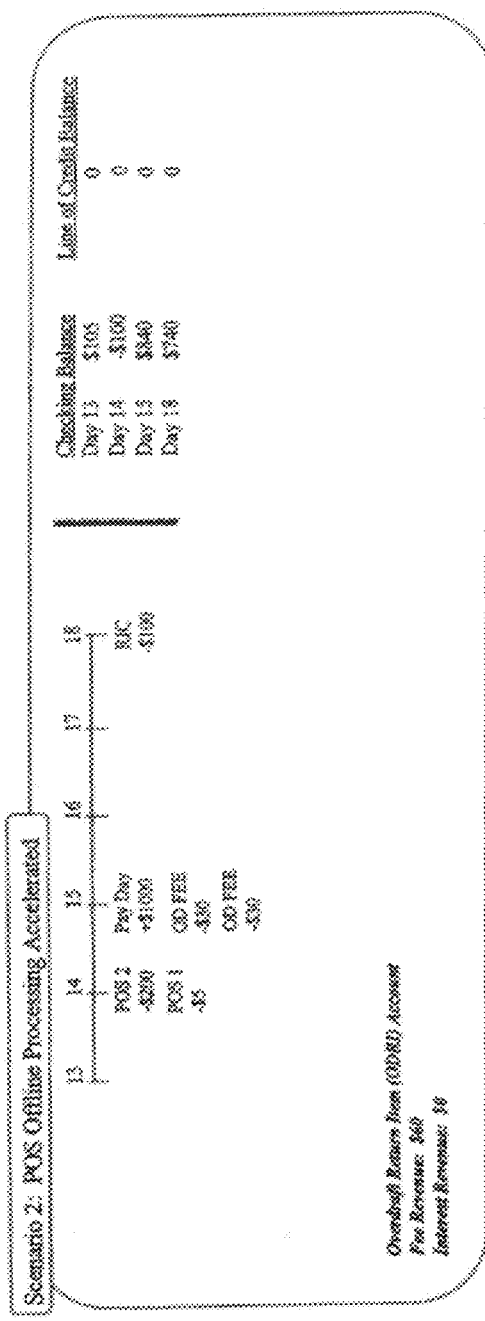

In scenario 2 in both FIG. 1B and FIG. 2B, POS offline processing is accelerated, such that POS 2 now posts on the $14^{th}$ and the checking account becomes overdrawn in both cases. In the case of the overdraft protection account in FIG. 1B, the bank automatically transfers $200 from the line of credit (LOC) account to cover the overdraft and imposes an overdraft protection fee of $10. Thus, the bank has fee revenue of $10 and, as a result of the draw down from the line of credit account, the bank's interest revenue is increased by $0.1644 during the period under study for interest charged to the LOC account. In the case of the overdraft return item account in FIG. 2B, the account becomes overdrawn by $100. The bank imposes an overdraft transaction fee of $30 for each of the debits posted that day. These fees are associated with the accelerated POS offline (POS 2) debit transaction which drove the account into overdraft, and for the $5 POS online (POS 1) debit transaction which posted after it. In this case, the assumption was made that debits will post from highest to lowest. The two overdraft transaction fees post on the next business day, the $15^{th}$. Thus, the bank has fee revenue of $60 and interest revenue remains unchanged since there is no change to the line of credit account balance.

In scenario 3 in both FIG. 1C and FIG. 2C, in addition to POS offline processing being accelerated, returned item check processing is accelerated, such that the RIC now posts on the $14^{th}$ in both cases. In the case of the overdraft protection account in FIG. 1C, the bank automatically transfers $300 from the line of credit account to cover the overdraft and imposes a single overdraft protection fee of $10. Thus, the bank has fee revenue of $10 and, as a result of the draw down from the line of credit account, the bank's interest revenue is increased to $0.2466 during the period under study. In the case of the overdraft return item account in FIG. 2C, the account becomes overdrawn by $200 and the bank imposes three overdraft fees of $30 each, posted the next day on the 15th, for the three overdraft debits. Thus, the bank has fee revenue of $90 and the interest revenue remains unchanged. FIGS. 1C and 2C highlight a significant distinction in these examples in that the overdraft transaction fees are imposed on a per transaction basis, while overdraft protection fees are imposed on a per account per day basis. This difference results in the overdraft return item account generating significantly more incremental revenue than the overdraft protection account.

In scenario 4 in both FIG. 1D and FIG. 2D, returned item check processing is accelerated, such that the RIC now posts on the $14^{th}$ instead of the 18th in both cases. Unlike in scenarios 2 and 3, the POS offline debit (POS 2) is not accelerated. In scenario 4 in both FIG. 1D and FIG. 2D, no overdraft is created nor is any incremental revenue created, as compared to the baseline scenarios in FIG. 1A & FIG. 2A, which illustrates that not every instance of debit processing acceleration will increase revenues.

A comparison of scenario 4 with scenario 2, shows that revenues are created in scenario 2 but not in scenario 4. The accelerated debit, posting on the $14^{th}$, is $200 in scenario 2 rather than $100, as in scenario 4, which demonstrates that incremental revenues can be affected by the amount accelerated. Comparing scenario 4 to scenario 3 demonstrates the difference in revenues is created by the posting date of POS 2. Furthermore, accelerating the POS 2 posting from the $15^{th}$ to the $14^{th}$ has the same size, but opposite value effect, on revenue as delaying the POS 2 posting from the $14^{th}$ to the $15^{th}$, which illustrates that the elimination of delay in debit posting is as valuable as acceleration.

The scenarios depicted in FIGS. 1A-1D and 2A-2D illustrate a number of points. First, the acceleration of debit transactions relative to the credit activity in customer accounts can increase bank revenue streams, such as ODRI fee revenue, ODP fee revenue and interest revenue.

Second, the type of customer debit to be accelerated does not impact the incremental revenue generated through acceleration. Furthermore any type of debit will diminish the account balances, including bank-initiated debits. Although bank-initiated debits will often not lead to additional bank-initiated account maintenance fees.

Third, acceleration across more than one day will likely increase revenues more than acceleration across one day. In FIG. 1C and FIG. 2C, the returned item check was accelerated from Monday the 18$^{th}$ to Thursday the 14$^{th}$, across two business days and across four calendar days and lead to additional bank-initiated account maintenance fees. If the returned item check had been accelerated only one business day to Friday 15$^{th}$, there would have been no incremental revenue effect generated in FIGS. 1B and 2B.

Fourth, a more significant portion of the revenue increase will likely result from fee revenue, rather than from interest revenue (or interest expense reduction if a savings account served as the linked account.)

Fifth, the amount of the revenue increase will be a function of the type of customer account effected and the revenue streams relevant to that account type. Interest revenue will be effected by the amount of the accelerated debits and the calendar days by which the debit was accelerated. ODRI incremental revenue will be effected by the number and amounts of the accelerated debits. Higher amounts will drive more debits into overdraft. ODP incremental revenue will be affected by the number of accounts driven into overdraft, and secondarily by the value of the accelerated debits due to incremental interest revenue considerations.

Sixth, acceleration of debits across any day or number of days has the same revenue value as elimination of delay in posting debits. Acceleration and delay elimination have the same, but opposite revenue effect as deacceleration, delay or retardation of posting. Each day in which a debit posting is accelerated is equally valuable, and several days are more valuable than one, irrespective of where the debit is in the processing cycle. In the scenarios illustrated in FIGS. 1A-1D, and 2A-2D, POS 2 may post on the same day it was received by the posting bank, say the 14$^{th}$, or on the day after, on the 15$^{th}$. These may be logical Day 0 and logical Day 1 in processing terms. But the returned item check on the 18$^{th}$, may be at logical Day 6 in the processing cycle associated with its processing, having first been deposited at the bank on the 8$^{th}$(Day 0). The acceleration of the RIC posting from the 18$^{th}$ to the 14$^{th}$ could be acceleration from logical Day 6 to logical Day 4 in the processing cycle. Acceleration across any logical processing day is as valuable as acceleration across any other logical day; so acceleration from Day 6 to Day 5 is as valuable as from Day 3 to Day 2 or from Day 0 to Day −1.

Seventh, the incremental revenues to the account type revenue streams are irrespective of any settlement activity concerning the accelerated debits. It does not matter whether acceleration is before or after settlement nor whether there is any settlement at all. If POS 2 were deposited by a depositor whose account is in the same bank as the customer whose account is being debited for the POS transaction (i.e., if the BoFD is the same bank as the Payor Bank), there is no bank-to-bank settlement, and no money leaves the bank. For the returned item check, either there was no settlement or if settlement did occur, that settlement would be reversed by the 18$^{th}$. Where settlement becomes relevant is in consideration of the particular method of acceleration to be used. If the method of acceleration of debit posting also accelerates settlement of monies out of the bank, then that also needs to be factored into an analysis to determine the net revenue benefit to the bank.

Figure 3:
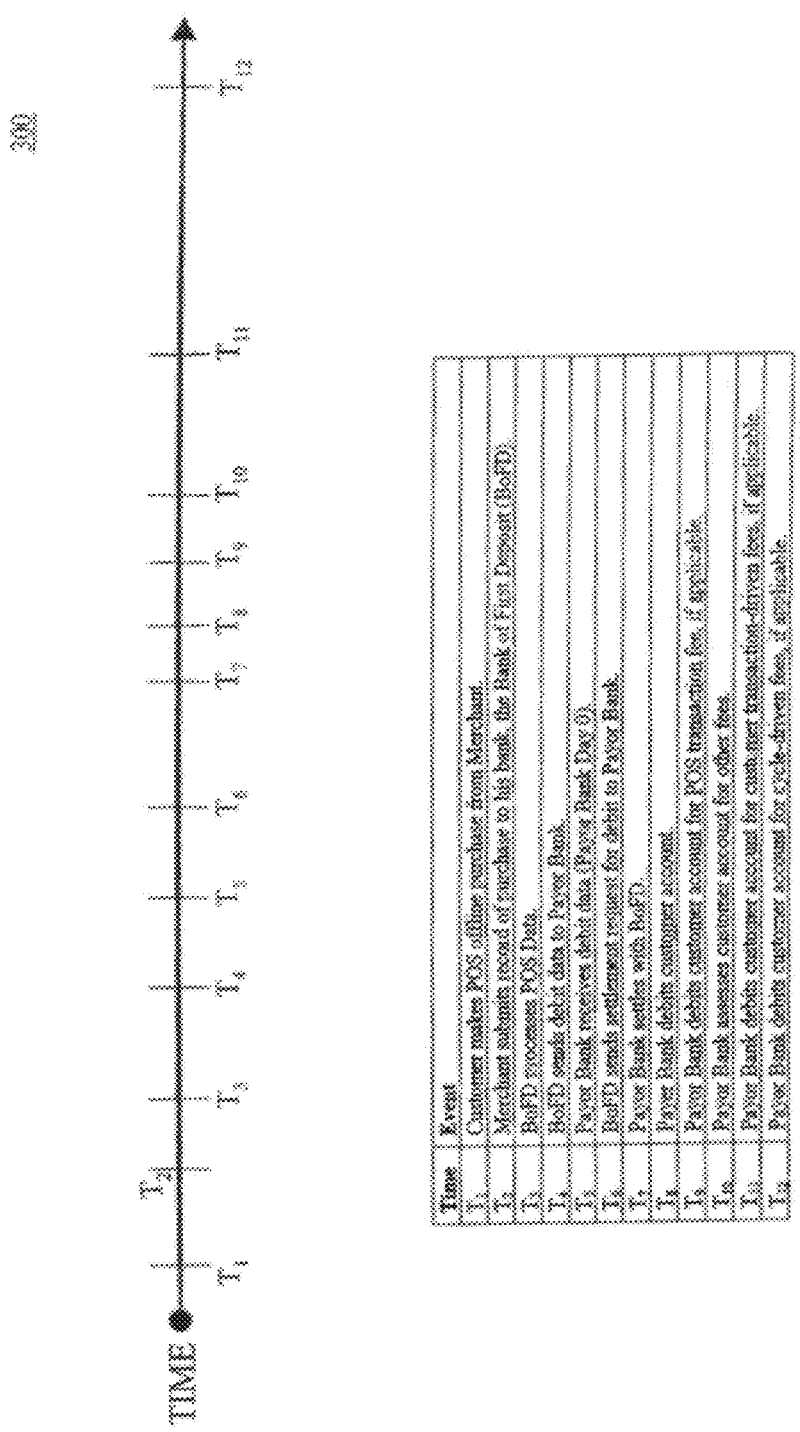
FIG. 3 is a diagram of a mapping of the processing of an offline POS transaction, according to an embodiment of the invention.

Referring to FIG. 3, timeline 300 represents a debit type transaction processing model. The model depicts the time of the major events in the processing of one type of debit transaction. In this example, the debit transaction that is depicted is a POS offline transaction in which a bank customer makes a purchase from a merchant who uses a different bank (the Bank of First Deposit or 'BoFD') than the bank of the customer (the Payor Bank). In fact, for illustration purposes, the model is a concatenation of a primary transaction, the POS offline transaction and several secondary debit transactions that can be triggered as a result of the POS transaction. As discussed more fully infra, there can be many potential scenarios for processing a debit transaction. FIG. 3 is provided to illustrate the mapping process of a debit transaction and is not intended to provide a definitive way to process POS offline debit transactions.

The time from T1 to T8 represents processing of the primary transaction, which in this case is an offline POS transaction. The process begins at time T1, when the customer makes a POS purchase from a merchant. At this time the customer makes a commitment, possibly by signing a paper receipt, which allows the merchant to request funds from the customer's bank account. The next point in the process is T2, which is when the merchant presents a POS record to the merchant's bank, BoFD, for processing. At time T3, BoFD records the transaction and begins processing the transaction. At time T4, BoFD sends the debit data to the Payor Bank. At time T5, the Payor Bank receives the customer account debit data. This is the first time that the customer's bank, the Payor Bank, knows about the debit and is typically referred to by the Payor Bank as Day 0. At time T6, BoFD requests payment in settlement from the Payor Bank which maintains the customer account and at time T7 the Payor Bank sends the settlement payment.

At time T8 the Payor Bank debits the customer's account for the amount of the POS transaction. This is referred to as posting of the debit transaction. Posting can be considered the final step of interest in the processing of a debit transaction for the purpose of the invention, as long as the posting is not reversed and the item 'unposted' and returned to the BoFD.

The time from T9 to T12 represents a model for processing of secondary bank-initiated debit transactions that can be associated with the primary transaction. As discussed previously these fees include: service transaction fees; customer transaction-driven, account maintenance fees; and cycle driven, account maintenance fees.

Each of the secondary transactions would have a separate model. For ease of illustration, however, not all secondary transactions are shown here. Rather, times T9 to T12 are provided to depict general categories of secondary transactions that can occur. The secondary debit transactions processing can be triggered by either the initiation or completion of the primary transaction, depending on the type of account debit. The time from T8 to T9 represents the model for the processing of any bank-initiated service transaction fee directly associated with the POS transaction. For example, in the case of a POS transaction this time period would be the time to determine whether a POS transaction fee applied, and if one did, posting it to the customer account.

At time T10, the customer bank assesses whether any bank-initiated account maintenance fees that are related to the transaction, should be debited from the customer account. Customer transaction-driven fees, such as an overdraft fee, can be imposed relatively soon after the completion of the primary transaction, as is depicted by time T11. Usually they are imposed on the same day of the debit transaction that triggered the fee as with the ODP fee, or on the next day as with ODRI fees. Cycle driven, account maintenance fees such as a minimum balance or other service fee, are imposed at the end of the banking cycle, typically a monthly cycle, for the particular customer. This is depicted by time T12 in the timeline.

There are several other points on the timeline that are of particular importance. The first important time is time T5. T5 is Day 0 for this particular transaction from the perspective of the Payor bank. Day 0 is the date that a bank defines as the first day in which transaction processing can begin. The other important time period is T6 through T7, which relates to the bank-to-bank settlement period.

Figure 4A:
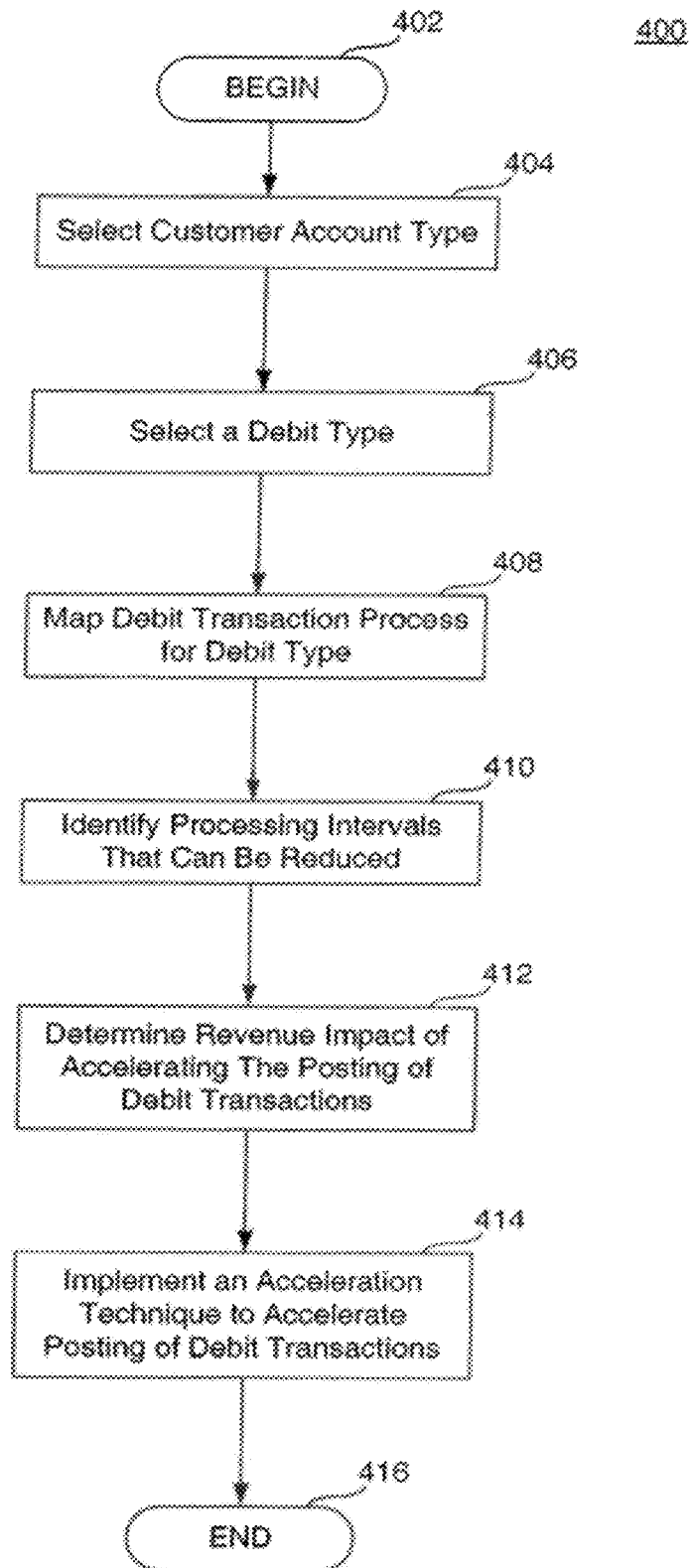
FIG. 4A is a flow chart of a method for increasing financial institution revenue, according to an embodiment of the invention.
Figure 4B:
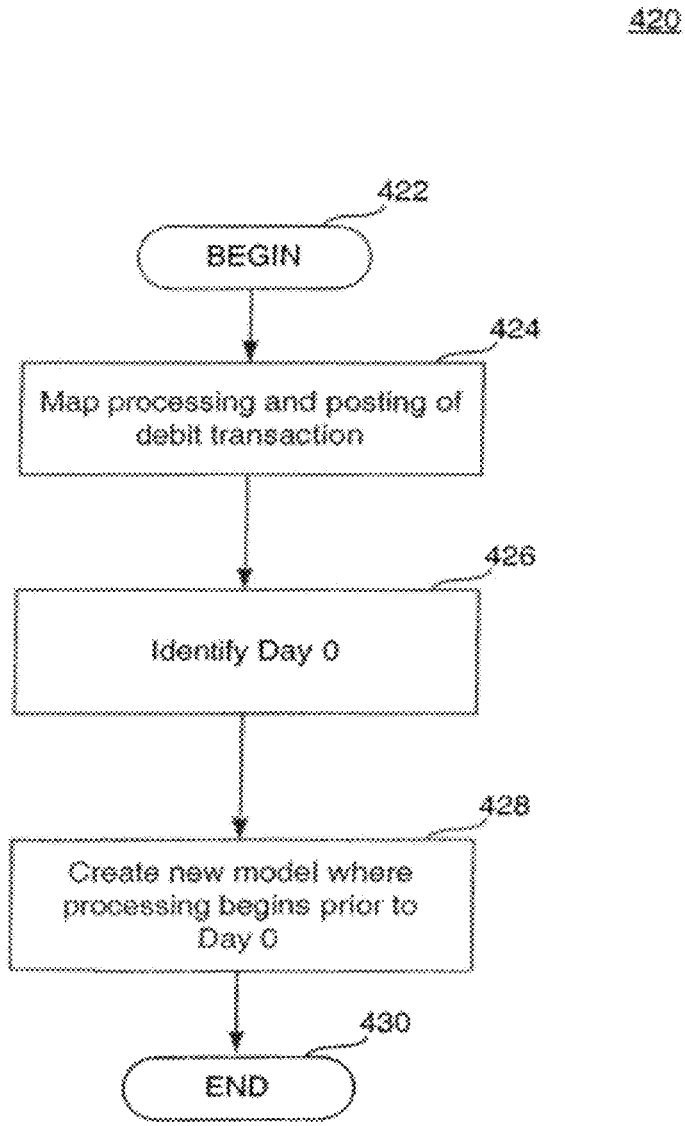
FIG. 4B is a flow chart of a method for increasing financial institution revenue, according to an embodiment of the invention.

The process illustrated in the flow charts of FIGS. 4A and 4B provides a method for increasing financial institution revenue, according to an embodiment of the present invention. Method 400 begins in step 402. In step 404, a customer account type is identified that will yield increased revenue when processing and posting of a debit type is accelerated relative to the credits in those accounts.

Customer account types can be organized in a number of ways. One method includes organizing accounts into retail customer accounts, commercial, and middle market accounts. Retail customer accounts are accounts associated with individuals. Whereas, commercial and middle market accounts are those associated with businesses. Commercial and middle market accounts are often referred to as analyzed accounts.

Retail customer accounts can be categorized as interest accounts or those subject to account maintenance fees that can be affected by debit acceleration. An interest bearing account generates interest income for a customer and generates interest expenses to the bank. Examples of interest bearing account types include, but are not limited to, savings, interest checking, market rate, money market, and time deposit accounts. An interest revenue account generates interest expenses for a customer and generates interest revenue to the bank. Examples of interest revenue account types include, but are not limited to, credit card and line of credit accounts. Examples of retail customer accounts that are subject to account maintenance fees include, but are not limited to, overdraft protection and overdraft return item accounts as described relative to FIGS. 1A-1D and FIGS. 2A-2D.

An account can be placed into one or more categories. For example, a checking account with overdraft protection that bears interest can be classified as both an interest bearing account and an overdraft protection account.

in selecting a customer account type to be considered, the most important factor is to select a customer account type in which debit processing acceleration will increase fee revenue, interest revenue or both. Examples of specific customer account types that meet this criteria include commercial accounts with overdraft protection, commercial accounts that are subject to account maintenance fees, overdraft protection retail accounts, overdraft protection return item retail accounts and all types of interest bearing accounts. Additionally, account types that are particularly vulnerable to fraud related activities can also benefit from debit acceleration.

For each of these account types, approaches can be developed to predict the impact of incremental fee and interest revenues that can result from acceleration of debit posting to these account types. Example approaches for commercial overdraft accounts, commercial accounts subject to fees, commercial accounts that are interest bearing, overdraft return item retail accounts and overdraft protection retail accounts are provided below.

While there are a wide range of commercial overdraft accounts, in one type of commercial overdraft account, a bank permits a commercial customer to overdraw its account. However, when an overdraft occurs the bank will impose a fee and charge interest on the amount that the account has been overdrawn. In this example, the primary incremental revenue stream to a bank that may be realized as a result of acceleration of debit processing is equal to the sum of the incremental fee and interest revenue. Specifically, the incremental revenue will be given by the sum of these two components as depicted in equation (1):

$$(N*F)+((\$*0.50)*D*I) \qquad (1)$$

Where,
N=the number of accounts driven into an overdraft position as a result of debit acceleration,
F=the dollar value of the daily account fee imposed on an account for being in overdraft,
$=the total dollar value of debits accelerated for accounts that were driven into overdraft,
D=the average number of calendar days that accounts are in an overdraft position, and
I=the interest rate applied for one calendar day.

The use of equation (1) to predict potential incremental revenue requires that certain factors be estimated. The factors to be estimated include D, N and $. D can be estimated as the number of calendar days in a year (365) divided by the number of business days in a year (251) times the reciprocal of the percentage of customers that cover their overdrafts, within the next business day (i.e., (365/251)*1/percentage of customers covering their overdrafts within one business day). A banking institution can provide estimates of the percentage of customers covering their overdrafts. Typically, for commercial accounts this percentage is approximately 90%.

To determine estimates of N and $, the following approach can be used In the first step, a median dollar amount (M1) of the debits within the debit type of be accelerated that are posted to the account types under consideration before implementation of an acceleration means is determined. Next, a determination is made as to the number of accounts (C1) in the account type under consideration with positive balances that are less than M1. Next, a determination is made as to the number of accounts (C2) with negative balances that are smaller than −M1. Finally, using bank data a mean dollar amount (M2) of the debits of the debit type of be accelerated, which are posted to accounts that are included within C1 and C2 is estimated. Then, N and $ are approximated by:

$$N=C1-C2 \qquad (2)$$

$$\$=M2*N \qquad (3)$$

Additionally, within equation (1) an assumption is made that the dollar amount of overdrafts will be equal to fifty percent of the dollar amount that is accelerated. As can be seen from this example, certain predictive factors must be estimated to provide meaningful results, even in the case where significant amounts of customer data are used or examined. These predictive factors will in large part be based on customer behavior, driven not by acceleration of debit processing, but by their existing behavior patterns relative to how quickly they cover overdrafts and respond to other types of banking experiences.

An additional analyzed accounts example relates to those analyzed accounts that incur bank-initiated account maintenance fees for account activity. These fees are often reduced depending on the customer accounts average balance. For example, if a customer maintains a balance that exceeds one million dollars, certain fees would be waived and other discounted. If that customer maintains a balance that is, for example, less than $500,000, then fewer fees would be waived or discounted. A bank determines what fees to waive based on a number of factors. One factor used is the tradeoff between interest that a bank might earn on funds on deposit with them compared to the amount of fees waived. Because of this relationship between interest revenues and fee waiver policy, and the tendency that when debit processing is accelerated average account balances will be lower, when acceleration of debits occurs the incremental revenue associated with increased fee revenue can be estimated by examining interest revenue impacts. Thus, the incremental revenue resulting from debit acceleration in this case can be approximated by:

$$50\%*\$*D*I \tag{4}$$

Where, $\$$=the dollar value of debits accelerated to analyzed accounts liable to account maintenance fees for account activity, D=the number of calendar days of acceleration, and I=the cost of funds interest rate applied for one calendar day.

In equation (4) the 50% factor is based on analysis of banking policies of the percentages of fees that they are likely to waive. This percent can vary by banking institution, but serves as a good overall estimation of the incremental revenue gain.

Finally, with respect to analyzed accounts, the incremental revenue associated with debit acceleration to analyzed accounts that are interest bearing can be estimated by the following:

$$\$*D*I \tag{5}$$

Where, $\$$=the dollar value of debits accelerated to analyzed accounts that are interest bearing, D=the number of calendar days of acceleration, and I=the interest rate applied for one calendar day.

Similar analysis can be developed for retail accounts. The impact of debit acceleration can be most significant on accounts that are overdraft protection and overdraft protection return item retail accounts. In the case of overdraft protection return item accounts, one approach to estimate the incremental revenue associated with accelerating debit processing is given by the following:

$$F*50\%*N1 \tag{6}$$

Where,

F=the overdraft item fee charged when a customer overdraws his account,

N1=the number of accelerated debits to overdraft return item accounts that are in an overdraft position.

In equation (6) the 50% factor is based on analysis of customer behavior, influenced by the policies of banks to waive fees and the rate of returned items (that do not diminish the account balance) to overdraft items. Given that the industry average is that approximately 1% of overdraft return item accounts are in an overdraft position at any given time, equation (6) can also be written as:

$$0.5\%*F*N2 \tag{7}$$

Where,

N2=the total number of accelerated debits to overdraft return item accounts.

Equation (7) can be used to demonstrate the incremental value of each accelerated item to a bank. For example, if F=$30, every accelerated debit is worth 15 cents to a bank.

In the case of overdraft protection accounts, the incremental revenue associated with accelerating debits can be approximated by:

$$35\%*F2*N3+\$*I \tag{8}$$

Where,

F2=the overdraft protection fee charged when the overdraft protection feature is applied, N3=the number of overdraft protection accounts which exercise the protection feature (i.e., drawing down finds from the protecting accounts), which contain the debit type of be accelerated, $\$$ is the incremental amount of the debits drawn down because of acceleration, and I=the interest rate of the linked account type, or a weighted average of the different interest rates of the linked accounts.

In equation (8), $\$$ can be approximated the following equation.

$$\$=50\%*35\%*A \tag{9}$$

Where,

A=the dollar amount of the debit type in overdraft protection accounts already in an overdraft position prior to the acceleration.

In step 406, a debit type for consideration is selected. The debit type can be either a customer-initiated debit or a bank-initiated debit. Examples of customer-initiated debits include, but are not limited to, a POS offline debit created by a check card or debit card purchase, a POS online debit created by a check card or debit card purchase, a POS online debit created by a check card advance, a check purchase, a wire withdrawal or transfer, an automatic electronic debit, an Internet debit and an ATM withdrawal. Examples of bank-initiated debits include, but are not limited to a returned item fee, incoming returned item, overdraft transaction fee, and an overdraft protection fee.

Complicating the analysis of different types of debits, banks tend to have different typologies for customer-initiated debits. The typology described above is based on the payment instrument, which is usually visible in a bank's demand deposit accounting computer systems. This typology can be used within the present invention. Such a typology, however, can make precise cost benefit analysis of the impact of debit acceleration difficult because of the many ways a particular debit type can be processed. For example, in a typology based only on the payment instrument, credit card transactions using a mechanical sliding card imprint device in which a merchant delivers the paper receipt to a bank would be classified the same way as a credit card transaction in which details of the transaction were transmitted electronically at the time of the purchase. Such a classification would make identification of ways to accelerate a process difficult in that the processing characteristics are quite distinct.

Likewise, checks can be processed in many ways with very different transaction processing characteristics that would make analysis based solely on the fact that a check was processed difficult. For example, a check that was delivered to a BoFD on logical Day −2, then spent two days in process by a clearing house or the Federal Reserve, prior to delivery to the posting bank, has very different processing characteristics from those of a check that was received by mail from a third party lockbox processor. An enhanced typology scheme should be able to distinguish between different processing characteristics that affect the cost benefit analysis associated with debit transaction processing accelerations.

In an alternative embodiment of the present invention, enhanced typologies can be developed to enhance the ease and precision of cost benefit calculations related to the acceleration of a particular debit type. In particular, an enhanced typology can be created based on the following features: (1) the instrument, (2) the source; (3) the channel, (4) the route through which the debit was processed; and (5) the timeline.

Importantly, the approach should be able to distinguish a debit in which the posting of the debit and credit associated with the transaction is within the same bank or when they are in different banks. This is important because it shows whether or not money will be sent out of the bank in settlement when the debit is posted. In this example, the term bank refers to any individual branch or two branches belonging to the same banking institution (e.g., a Bank of America branch office in New York and a Bank of America branch office in California).

In step 408, debit transaction processing for the selected debit type is mapped. FIG. 3 depicts one example of a timeline that can be created through the mapping process. The key attributes of such a timeline are that it depicts the major transition points, such as communication between the payor, the payee, and the financial institutions involved in the process. Furthermore, the timeline identifies factors influencing the timing of and duration between processing events. A debit type using a simple typology can have many different maps with different routes. As the complexity of the typology scheme increases, a debit type within that typology will have fewer different maps. In either case, analysis should occur for each of these different maps and routes for a particular debit type.

In contrast to conventional wisdom within the banking industry, the timeline used in the mapping should begin at the time of the customer's payment authorization, rather than at what is commonly referred to as Day 0, which is the first day that a bank begins processing the debit. While Day 0 can sometimes be the same as the date of a customer commitment to have monies debited from an account, this is not always the case. Artificially limiting consideration of acceleration of the process to start at Day 0, unnecessarily reduces potential revenue opportunities, since acceleration to the bank is as valuable as acceleration within the banking process.

Furthermore, when mapping the process, the times should not be limited to measurements in terms of days as is often the case, but rather hours and minutes should be recorded. Each debit type can have different daily cut-off times for customer and institutional processing activities. Thus, what constitutes a business day can vary for different debit types. For example, if the ACH bank delivery cut-off time is 6 pm and the check delivery cut-off time is midnight. In this case, if the BoFD converts a check to ACH after 6 pm, but before it could deliver that check to the posting bank by midnight, then posting of the debit to the customer's account is delayed by one business day.

In step 410, once a map has been created, the timeline is examined to identify processing intervals that can be reduced. Many alternatives can exist to reduce the processing interval. For example; the debit can be re-typed to a type of debit that reaches the banking system earlier and therefore posts earlier. The debit can be delivered earlier to the BoFD. The progress and velocity of the debit through the banking communication process to the posting bank can be enhanced. The posting banking processing can be enhanced.

For example, for the POS transaction depicted in FIG. 3, time periods from T1 to T8 would be examined to determine what processing, if any, could be accelerated. An examination might indicate that the period from T1 to T3, which is the time it takes before the BoFD processes a PUS receipt from a merchant, can be reduced. As one possibility, some POS offline transactions could be converted to POS online transactions to exploit the difference in cut-off times and gain one business day.

Once all the merchants who are customers of the bank have POS online machines instead of offline machines, there will be some acceleration of both the merchants' POS credits and their customers' debits. Additional revenue gains can be generated by extending the merchant cut-off time for POS online by two hours. This will move approximately 10% (equal to 2 hours divided by 24 hours in day, assuming POS online transactions are relatively equally distributed across the day) of such credits and debits from one business day to the prior one.

Another possible technique for acceleration involves accelerating intra-bank processing within large banks. Many large banks have separate legal entities in each State, as well as separate processing centers in different regions. Processing checks delivered in one region, but posted to an account domiciled in another often takes an extra day. Converting a check to an electronic form can enable the customer's account to be debited one day earlier. Where the depositing customer credit is in the same institution, this debit requires no movement of money outside the institution. The debit is accelerated while the availability of funds to the depositor remains the same. The bank thus gets all the revenue benefits of debit acceleration without any diminishment of monies in the bank.

In some instances, debits can be accelerated without accelerating the credit, the obvious example being check processing. In other instances, debits can be accelerated by accelerating the whole deposit, as with POS debits. Both of these scenarios are beneficial. When a bank accelerates credits to accelerate debits, it is important to realize that the associated customer credit and debit are not in the same accounts, often not in the same account types, and usually not in the same bank. Most debit items will be to retail accounts, while most credit dollars will be to company accounts; more rarely, on pay days, is a commercial account debited to provide many credits to its employees' retail accounts.

In general, acceleration techniques can be categorized into several analytic possibilities, all of which will increase debit acceleration revenues gained in the bank. In the first case, debits inside the bank are accelerated, but only for the bank's deposits and without accelerating credits. Here customer balances are diminished, but no monies leave the bank. Processing of depositor's checks is one possible example. A second case, is when debits are accelerated to other institutions, and settlement back into the bank may be accelerated. In this case, there will also be more monies in the bank.

In a third scenario, in order to accelerate debits, the bank accelerates its depositors' credits. This advances the availability of funds to the depositor but also the settlement of other institutions to the bank. Monies in the bank are likely not to be diminished. For example, consider that the use of a check or debit cards at offline POS terminals is a retail consumer activity that is confined to non-interest retail checking accounts. Some of these accounts will be liable to ODRI fees and others liable to ODP fees. The only revenue streams to be affected are changes to ODRI, ODP and the monies in the bank. If the method of acceleration is to accelerate the processing of the bank's merchant customers with POS offline transactions, then credits, settlement to the bank of associated debits posted in other institutions, and the posting of associated debits in the bank to ODRI and ODP accounts will be also accelerated.

In those three possibilities, the bank under consideration was also the BoFD. The Payor Bank was also the Payee Bank.

Other analytic possibilities exist where the bank under consideration, the Payor debit posting bank, is not the BoFD or Payee Bank. If the debit from another institution is accelerated to generate additional revenues, customer balances will be diminished but, in most cases, settlement of monies out of the bank will be accelerated. Furthermore, if the BoFD accelerates its depositors' credits, then some of the Payor Bank's debits will tend to be accelerated with accelerated settlement back to the BoFD. These are the worst scenarios for the considered Payor bank and profitability must be considered.

If the BoFD accelerates its retail checks to the Payor Bank by one day, the Payor Bank will gain ODRI and ODP revenue, but may need to settle one day earlier. A determination whether the increased revenue per item outweighs the diminishment of monies in the Payor bank by accelerated settlement must occur. For example, if the average item is $300, an assessment must be made to determine whether increased revenues of say, 25 cents an item due to increases fees from debit acceleration, outweigh the loss to the Payor bank of $300 per item for one business day. If the BoFDs accelerate to the Payor bank their POS debits, with an average amount of $100, will increased revenues of, for example, 20 cents an item, outweigh the loss to the bank's monies of $100 per item? To make this assessment a bank must consider the value of monies to the Payor Bank. In March 2003, the overnight Federal Funds rate stood at 1.25% per annum (pa) and the cost of funds was approximately double that amount. A conservative approach can assume that the value of funds to the bank, created by various multiplier effects, is more or can increase as interest rates increase. If one assumes that the value of money to the Payor bank is 10% pa. Then the value of a $300 item across one business day is:

$$\$300.00 \times 10\% \times \frac{1}{251}(\text{business days in a year}) = 12 \text{ cents an item.} \quad (13)$$

And, using the same assumptions, the value of a $100 item would 4 cents an item. Thus, given that in many instances the revenue from acceleration exceeds 12 cents per day, the increased revenues of acceleration can outweigh the diminishment of the monies in the bank in many circumstances. And in other circumstances, the increased revenues of acceleration can be achieved without the diminishment of any monies in the bank, because the debit acceleration does not affect settlement. This is the case because there is no settlement or because the settlement date is unaffected by the posting date of the debit. For example, once settlement has occurred, say on Day 1, a lost or incoming returned item check can be advanced from Day 4 to Day 3.

Different debit types will affect different account types and therefore different revenue streams. The different average amounts of debit types will affect the same revenue streams differently. The method or technique of acceleration will affect the monies in the bank. These can all be calculated to predict the revenue effect of the method of acceleration of a particular debit type.

In step 412, the revenue impact of accelerating the posting of debit transactions for the selected debit type is determined. A number of embodiments to the invention can be used to assess the revenue impact. The choice of embodiment to be used will be driven by factors such as the availability of actual customer data, the degree of precision desired in estimating the revenue impact, and the costs to generate the revenue impact. Four embodiments to estimate revenue impacts associated with accelerating debit transaction processing include: (1) using a system as described herein with reference to FIGS. 5 and 6, (2) using a set of equations that model service fee and interest changes as described with respect to step 404 above, (3) using customer reaction predictive factors along with simplified modeling equations as provided in several examples with respect to step 404, and (4) multiplying the current revenue associated with an account type by the fraction of debits being accelerated relative to the total value of debit transactions within an account type.

Within this step 412, the number of items to be accelerated, the number of days that items will be accelerated and the value of the items to be accelerated must be determined, or estimated. The level of precision in determining these values will significantly impact the precision of the incremental revenue predictions.

Figure 5A:
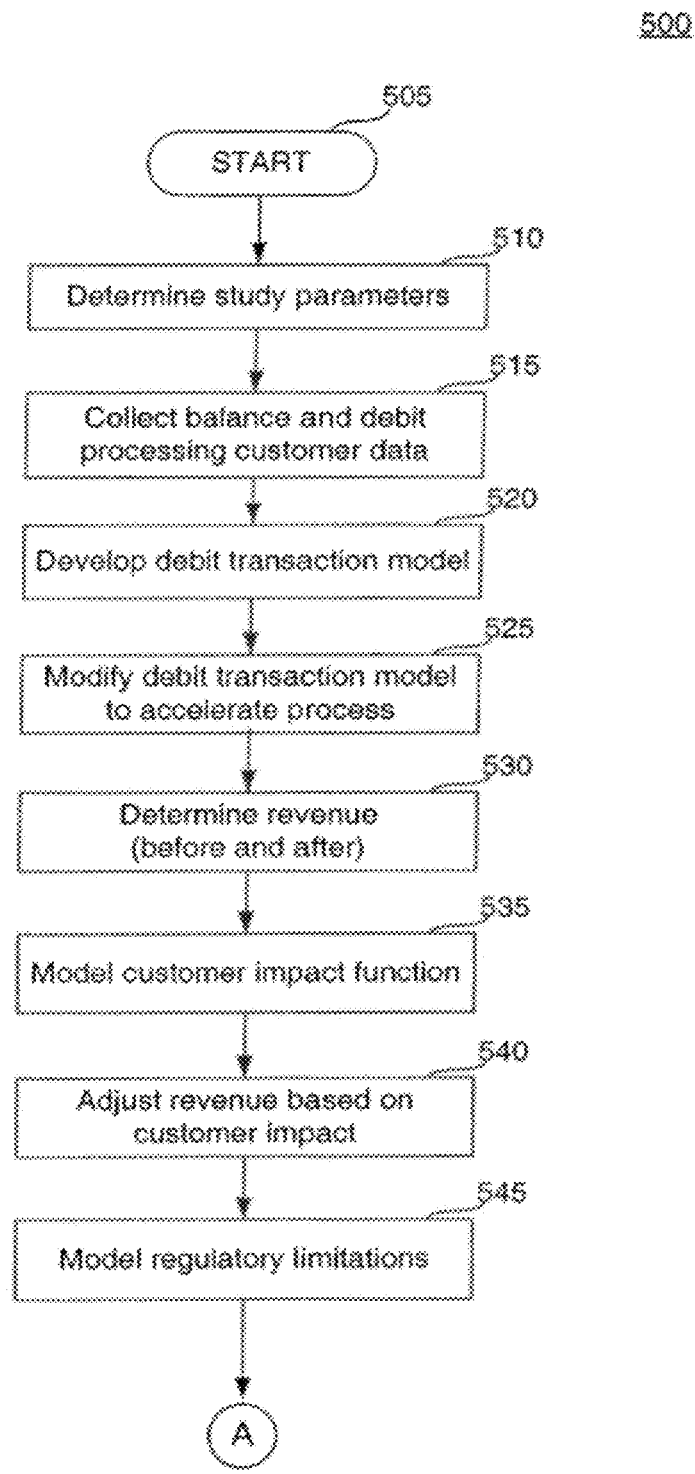
FIGS. 5A and 5B are flow charts of a method to determine the impacts of accelerating the processing of a type of debit transaction, according to an embodiment of the invention.
Figure 5B:
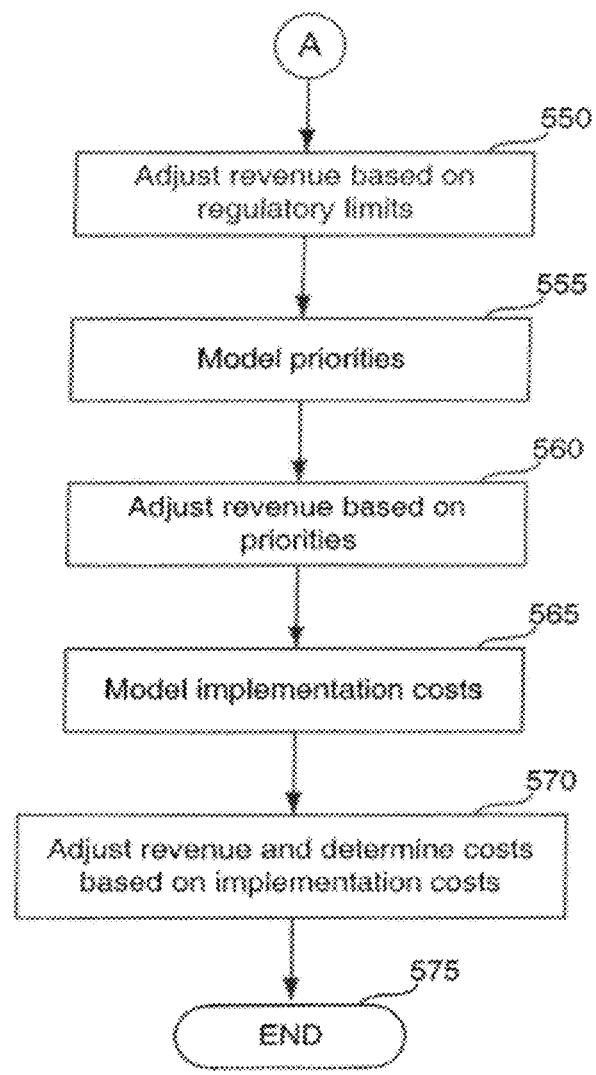
Figure 6:
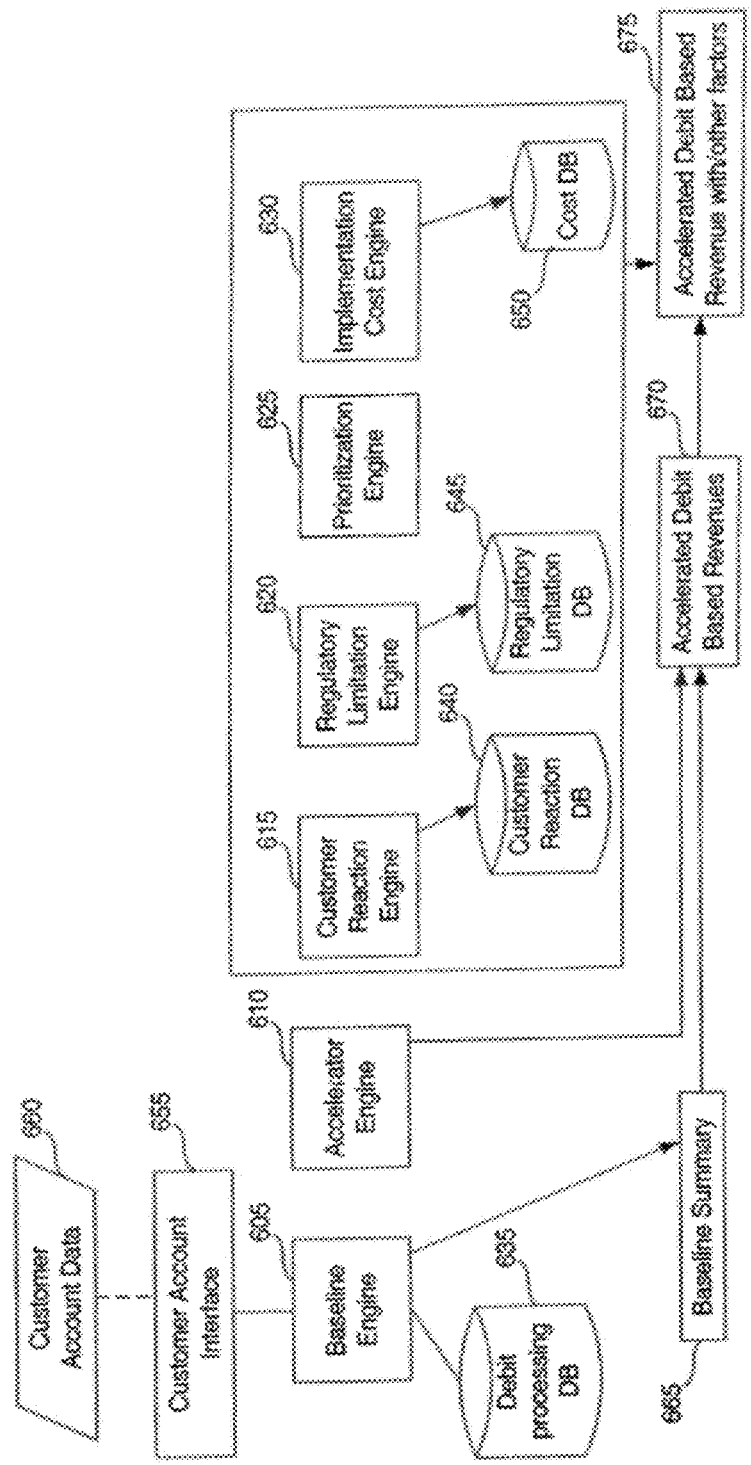
FIG. 6 is a diagram of a system to determine the impacts of accelerating the processing of one or more types of debit transactions, according to an embodiment of the invention.

In the first embodiment, a system such as described herein with reference to FIGS. 5 and 6 can be used. The use of such a system is likely to provide highly precise results, however, the cost to implement such a system can be prohibitive. The use of the system will provide relatively high precision results in that actual customer data is manipulated to model what a bank's incremental revenue would be if debit transaction processing was accelerated.

In the second embodiment, a set of equations like those discussed with respect to step 404, can be used to predict the potential revenue associated with accelerating the processing of a type of debit for a particular customer accounts type. Use of this embodiment is likely to result in revenue estimates that are not as precise as those generated through the use of the first embodiment, however, the costs to implement such an approach are likely to be significantly less.

In the third embodiment, which is similar to the second embodiment, a set of predictors can be used to determine the incremental revenue to a bank resulting from acceleration of debit transactions for a particular account type. Initially, customer behavior predictive factors can be based on existing banking behavior patterns. As more experience is gained in actually accelerating debit processing and monitoring customer reactions (e.g. do customers immediately cover an overdraft resulting from debit processing acceleration, do they change their banking characteristics to avoid overdrafts or other fee generating events driven by debit acceleration), customer behavior predictive factors can evolve to more accurately model customer behavior resulting from debit processing acceleration. Thus, in general the incremental revenue to a bank from increasing debit processing can be modeled as:

$$P*(\text{Fee Revenue} + \text{Interest Revenue}) \quad (11)$$

Where, P is a customer behavior predictive factor based on the type of debit being accelerated and the type of account.

These predictive factors will vary based on the type of customer, type of account and type of debit being accelerated. For example, while commercial customers tend to cover their overdrafts with credits on the next business day in approximately 90% of the cases, retail customers (e.g., individuals) tend to do so in only about 50% of the cases. This percentage varies by weekday, week of the month, and payday period. Alternatively, given the likelihood that the incremental revenues generated from additional account maintenance fees will be orders of magnitude greater than the incremental interest revenues, equation (11) can be approximated by:

$$P*(\text{Fee Revenue}) \quad (12)$$

In both equation (11) and (12) the fee revenue and interest revenue can be estimated using approaches similar to those used in the second embodiment discussed above.

Additionally, other factors—not related to customer behavior—can impact the revenue generated through debit acceleration that need to be considered. For example, the order in which debits are processed can also impact incremental revenue. If a bank processes debits from largest to smallest, accelerations of debits is likely to have a larger impact than if debits are processed from smallest to largest.

In the fourth embodiment, a rough approximation of the incremental revenue can be estimated by multiplying the current revenue associated with an account type by the fraction of debits being accelerated relative to the total value of debit transactions within an account type.

In addition to these calculations the net effect of acceleration must take account of the extent to which the method of acceleration increases or diminishes the moneys in the bank, thereby affecting the bank's investable funds, the sale and purchase of Fed Funds and loan amounts. The analytic possibilities were discussed with respect to step 410 above. Algorithms to estimate revenue impacts associated with these affects will be known to individuals skilled in the relevant arts and will not be reproduced here.

In order to determine the overall impacts of debit acceleration, the impacts of all debit types to be accelerated must be determined for each account type that will be effected. The incremental revenue gains then must be summed across all debit types and customer account types being considered. Finally, the negative revenue impacts (e.g., net on funds lost), if any, must be determined and subtracted from the total incremental revenue gains.

There is one further revenue impact of debit acceleration that is not only beneficial to banks but also to the public, in that it diminishes fraud losses. Acceleration, especially of such debits as incoming returned items, can lead to the earlier detection of frauds in customer accounts. Such frauds are often perpetrated until the account is frozen; the earlier the account is frozen, the greater the fraud prevention and loss prevention.

In step 414, an acceleration technique is implemented to accelerate posting of debit transactions. The acceleration technique can be determined by assessing the most revenue enhancing approaches to achieve reduction to the processing intervals identified in step 410 through use of the mapping created in step 408. In step 416, method 400 ends.

Method 420, as depicted in the flowchart of FIG. 4B, provides one method to accelerate the processing of an account debit transaction, according to an embodiment of the present invention. Method 420 is a method to identify what day the posting bank currently determines to be Day 0, and to determine a way to accelerate processing such that processing can begin before Day 0, such as Day −1 through Day −N. N is the number of days between when the customer authorizes a debit from his account to when the bank actually begins processing the debit, which is currently defined as Day 0 by the bank. Referring again to FIG. 3, T5 represents Day 0 from the Customer Bank or Payor Bank perspective and T1 represents Day −N for the offline POS transaction. Depending on how long the merchant takes to provide the POS record to the merchant's BoFD and how long the BoFD takes to process the POS record, N could be several days. By accelerating processing such that these days are not lost, the debit can be posted to the customer's account sooner, leading to additional bank revenue.

Method 420 begins in step 422. In step 424, the debit type transaction processing is mapped, for example as discussed in FIG. 3. In step 426, Day 0 is determined from the map. In step 428, a new map is created where the processing begins prior to Day 0. Method 420 ends in step 430. As one example of the application of this model, consider the offline POS transaction in FIG. 3. In that case, in step 428 a processing map can be developed and implemented that moves the start of processing from T5 to T1, or perhaps T2. One solution would be to have the merchant use an online POS system as opposed to an offline POS system. However, the merchant costs may not warrant this or the merchant may simply refuse to charge its way of operation. Therefore, other means might be considered. For example, the merchant's BoFD might schedule regular collections of POS receipts from merchants to reduce the delay between T2 and T1. What is important is not necessarily the acceleration method, but rather the result of acceleration to shift the processing, so that processing begins before what the bank considers Day 0.

Another acceleration technique to achieve acceleration of debit type transaction processing is back valuation of the posted debit amount. In this case, a bank may post a debit to a customer account on a given day, but back value the debit to the business date the customer authorized the debit. Once the debit is posted, the bank will re-generate the customer account balances to reflect a debit occurring on the date the customer authorized the debit. In doing so, the bank will assess any additional fees that may apply and adjust interest calculations. Regulations may control the allowable instances of back valuation, as may customer sentiment. Credit card receipts generated by offline mechanical sliding imprinters carry a payment authorization date, which could, in theory, be used as a back valuation date.

Another way to achieve acceleration of debit transaction processing can include converting one type of debit to another type to accelerate processing. So, for example, a check might be converted to an ACH type transaction to accelerate processing. Yet, another way to achieve acceleration of debit transaction processing would be to adjust the cut-off times for processing a debit type. On each day, a bank has certain cut-off times that determine whether a transaction will be processed that business day or wait until the next day. If these cut off times are moved later in the day, more transactions can be processed that same business day, rather than on the next business day. Such acceleration can lead to significant incremental revenue. These examples are illustrative, and not intended to be limiting. Individuals skilled in the relevant arts will be able to identify other ways to apply debit transaction acceleration techniques based on the teachings herein to achieve the revenue increases that are discussed.

The acceleration of debit transactions as discussed above has the potential to significantly enhance bank revenues. However, for a number of reasons, the process of accelerating debits raises many interrelated issues that are not well understood and quite complex. FIGS. 5A and 5B show a flowchart of a method 500 to evaluate these interrelated factors to assist in the evaluation of the potential revenue gains from accelerating debit type transactions, according to an embodiment of the present invention. The method describes an evaluation method to assess the revenue impacts associated with accelerating processing of one or more debit types. In addition, method 500 determines the impacts on revenues derived from accelerated debit transaction processing from such factors as customer reactions, regulatory limitations, prioritization, and implementation costs. The method describes how actual customer data can be examined to demonstrate to bank personnel the impacts on particular customer accounts.

Method 500 begins in step 505. In step 510, study parameters are selected. The study parameters can include, but are not limited to the types of accounts to be considered, the number of accounts to be examined and the time period for which account balance, credit and debit activity will be monitored. In step 515, balance and debit processing data are collected for a sampling of a bank's customers, based on the parameters selected in step 510. In step 520, debit transaction models are developed for the debit types to be included in the study. Debit transaction models are created from the debit type processing maps, as in FIG. 3. In step 525, debit processing is accelerated in at least one of the debit transaction models.

In step 530, the revenue generated to the bank associated from the acceleration is determined using the existing debit transaction models and the debit transaction models where processing has been accelerated. Using accounting models similar to those in FIGS. 1A-1D and FIGS. 2A-2D that factor in the accelerated debit transaction models, the effects on all revenue streams changed and on monies in the bank are calculated and summed. These results demonstrate to the bank the revenue impact associated with accelerating the processing of one or more debit transaction types.

In step 535, the customer impacts are modeled. Examples of the customer impacts that can be modeled include whether a customer will modify banking behavior in such a way that the impact of the debit acceleration will be nullified or reduced, and even whether the customer will close an account because of the acceleration of debit transactions. In step 540, the revenue projections generated in step 530 are adjusted to account for potential customer reaction impacts.

In step 545, regulatory limitations that can restrict the acceleration of debit processing are modeled. Examples of regulatory limitations that can be modeled include Federal Reserve Bank regulations and State laws. These regulatory limitations, which are often complex, include the opportunities for back valuation, the conversion of debit types, the movement of cut-off times, and the timing of settlement for different debit types. In step 550, the revenue projections generated in step 530 are adjusted to account for potential regulatory limitations. In addition, if both customer impacts and regulatory limitations are examined together the projections generated in step 540 can also be adjusted.

In step 555, a bank's priorities are modeled. One example of the priorities that can be modeled includes whether a bank wants to accelerate debit processing more for a particular category of customer accounts, for example, more for retail consumer customer accounts than for wholesale commercial accounts. In that case, the POS debit type would be more appropriate than the ACH debit type, as a target for potential acceleration. Another example priority that can be modeled is scheduling information for when different processes will be accelerated. In step 560, the revenue projections generated in step 530 are adjusted to account for the bank's priorities. In addition, the projections generated in step 540 and step 550 can also be adjusted.

Finally, in step 565 implementation costs are modeled. These include the costs associated with implementing a particular method to accelerate a debit type transaction process. For example, a bank may need to upgrade computer systems to enable it to process debit transactions in real time instead of waiting until after the normal business day cut-off time to do so. In step 570, costs are determined and the revenue projections generated in step 530 are adjusted to account for potential implementation cost limitations. In addition, the projections generated in step 540, 550 and 560 can also be adjusted.

As will be known by persons skilled in the relevant art, the customer impact, regulatory limitation, prioritization and cost limitation factors can be applied in any combination to generate different perspectives to assist a bank in evaluating the financial ramifications of accelerating the processing of debit transactions. Further, any other factors that may impact revenue could be considered in a similar fashion.

FIG. 6 is a block diagram representing system 600, according to an embodiment of the invention. System 600 is a system for implementing the method depicted in FIG. 5. System 600 includes baseline engine 605 and associated debit processing database 635; accelerator engine 610; customer reaction engine 615 and associated customer reaction database 640; regulatory limitation engine 620 and associated regulatory limitation database 645; prioritization engine 625; and implementation cost engine 630 and associated cost database 650. Engines 605, 610, 615, 620, 625, and 630 are used to generate revenue projections, analysis and the like.

System 600 also includes customer account interface 655. Customer account interface gathers customer account information and organizes the data into a useable format for system 600.

Baseline engine 605 is used to calculate baseline summary 665 that provides actual revenues received from a sampling of customer accounts. Baseline engine 605 enables a user to select study parameters, such as types of accounts to be used, the method of selection for those accounts, the study period to be examined and other related variables. Baseline engine 605 also relies upon debit processing database 635 to provide generic transaction debit models to enable a user to efficiently model baseline debit transactions for a particular bank. Debit processing database 635 contains generic debit transaction models for the common transaction types (e.g., POS transactions, ATM transactions, etc.).

Baseline engine 605 prompts the user to identify the types of debit transactions to be analyzed. Baseline engine 605 also permits the user to input values for each of the timeline points for the debit transaction types that correspond to the particular bank's process. Alternatively, where the timeframes are unknown, default values can be used. Thus, rather than reinventing each process with each use, baseline models exist to make use of the system more efficient. Baseline engine 605 generates baseline summary 665. In one example, baseline summary 665 includes summary statistics on the sample customers (e.g., number of accounts, total balances, average balances), total revenue to the bank generated by the customer accounts, fee revenue generated to the bank, and summaries of the fees for each of the types of debits. Baseline summary 665 can also suggest debit transaction processes that the bank should consider accelerating.

Accelerator engine 610 enables the user to manipulate the debit transaction models to determine the impact on batik revenues. Accelerator engine 610 enables the user to accelerate the debit transaction models by adjusting the timeline values in a transaction model. Once a user has made adjustments to the debit transaction models, accelerator engine 610 generates output 670 which shows the impacts of the accelerating the debit transaction processing.

Customer reaction engine 615 determines the potential customer reactions to acceleration of a particular type of debit transaction. In one embodiment, customer reaction engine 615 relies on customer reaction database 640 to provide customer reaction factors. For example, customer reaction database 640 can contain the probability that a customer will modify behavior such that the impact of accelerating a debit transaction will be nullified. Additionally, customer reaction database 640 can contain the probability that a customer will close an account if a debit transaction process is accelerated. Customer reaction engine 615 can use information directly from customer reaction database 640 or prompt a user to supply values for customer reaction factors. Customer reaction engine 615 individually or in combination with the engines 620, 625 and/or 630, then applies the customer reaction factors to output 670 to produce output 675 that demonstrates the impacts on projected revenue of potential customer reactions.

Regulatory limitation engine 620 determines the impact of banking regulations, laws and custom on the acceleration of a particular debit transaction. Regulatory limitation engine 620 relies upon regulatory limitation database 645 to provide data on regulatory limitations that may impact acceleration of a particular transaction type. Regulatory engine 620 applies the regulatory limitation factors to output 670 to demonstrate the impacts on projected revenue of potential regulatory limitations. A summary of the regulatory limitations applied can also be presented. Regulatory limitation engine 620 individually or in combination with the engines 615, 625 and/or 630, then applies the regulatory limitation factors to output 670 to produce output 675 that demonstrates the impacts on projected revenue of regulatory limitations.

Prioritization engine 625 determines the impact of the bank's scheduling priorities for implementing changes to revenue projections generated by the other engines. Prioritization engine 625 can include functions that permit a user to implement acceleration changes to a certain subset of debit types (e.g., only POS offline debit transactions) or a subset of accounts (e.g., only retail accounts) and also to provide schedules for when the changes would be implemented. Priority engine 625 individually or in combination with the engines 615, 620 and/or 630, then applies the prioritization factors to output 670 to produce output 675 that demonstrates the impacts on projected revenue of the prioritization factors.

Implementation cost engine 630 determines whether the cost of implementing a particular change to a debit transaction process may be cost prohibitive and also generates cost information for implementing a particular change. Implementation cost engine 630 relies on cost database 650 to supply basic cost information for typical ways to accelerate transaction processing. In addition to relying on this information, implementation cost engine 630 enables a user to provide cost information. Implementation cost engine 630 applies the cost limitation factors to output 670 and the outputs generated by other engines to demonstrate the impacts on projected revenue of cost limitations. Additionally, cost engine 630 will generate a summary of projected costs to implement means to accelerate debit transaction processing. Implementation engine 630 individually or in combination with the engines 615, 620 and/or 625, then applies the implementation cost factors to output 670 to produce output 675 that demonstrates the impacts on projected revenue of the implementation cost factors.

Conclusion

Exemplary embodiments of the present invention have been presented. The invention is not limited to these examples. These examples are presented herein for purposes of illustration, and not limitation. Alternatives (including equivalents, extensions, variations, deviations, etc.; of those described herein) will be apparent to persons skilled in the relevant art(s) based on the teachings contained herein. Such alternatives fall within the scope and spirit of the invention.

What is claimed is:

1. A computer-implemented method for increasing financial institution revenue through acceleration of debit transaction posting to customer accounts, comprising:
   (a) identifying with a computing device opportunities to accelerate the posting of debit transactions within a debit type for a customer account type;
   (b) determining with a computing device the revenue impact to the financial institution of accelerating the posting of debit transactions within the debit type for the customer customer account type; and
   (c) accelerating the posting of debit transactions for the debit type, based on the determination of the revenue impact to the financial institution of accelerating the posting of debit transactions within the debit type for the customer, account type.

2. The computer-implemented method of claim 1, wherein said debit type is a customer-initiated debit type.

3. The computer-implemented method of claim 2, wherein the customer-initiated debit type is an automated clearing house (ACH) debit or a paper check.

4. The computer-implemented method of claim 2, wherein said debit type is a bank-initiated debit type.

5. The computer-implemented method of claim 4, wherein said bank-initiated debit type is an overdraft fee debit, overdraft protection fee debit, or incoming returned item debit.

6. The computer-implemented method of claim 1, wherein step a further comprises:
   (i) mapping with a computing device the processing of the debit type; and
   (ii) identifying processing intervals that can be reduced.

7. The computer-implemented method of claim 1, wherein the customer account type is an interest expense account.

8. The computer-implemented method of claim 1, wherein the customer account type is an interest revenue account.

9. The computer-implemented method of claim 1, wherein the debit type is a customer-initiated debit type.

10. The computer-implemented method of claim 9, wherein the debit type is an ATM transaction debit.

11. The computer-implemented method of claim 1, wherein determining the revenue impact to the financial institution further comprises:
    (i) determining incremental revenue generated from financial institution-initiated account maintenance fees;
    (ii) determining incremental revenue generated from interest revenue resulting from accelerating debits;
    (iii) determining a customer behavior predictive factor; and
    (iv) determining the revenue impact to the financial institution based on the incremental revenues generated in (i) and (ii) and the customer behavior predictive factor.

* * * * *